United States Patent
Minowa et al.

(10) Patent No.: US 11,851,786 B2
(45) Date of Patent: Dec. 26, 2023

(54) METHOD FOR PRODUCING CELLULOSE NANOFIBER CARBON

(71) Applicant: Nippon Telegraph and Telephone Corporation, Tokyo (JP)

(72) Inventors: Hironobu Minowa, Musashino (JP); Masaya Nohara, Musashino (JP); Mikayo Iwata, Musashino (JP); Shuhei Sakamoto, Musashino (JP); Hiroaki Taguchi, Musashino (JP); Takeshi Komatsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 143 days.

(21) Appl. No.: 17/606,562

(22) PCT Filed: May 13, 2019

(86) PCT No.: PCT/JP2019/018885
§ 371 (c)(1),
(2) Date: Oct. 26, 2021

(87) PCT Pub. No.: WO2020/230227
PCT Pub. Date: Nov. 19, 2020

(65) Prior Publication Data
US 2022/0205143 A1 Jun. 30, 2022

(51) Int. Cl.
*D01F 9/16* (2006.01)
*B01J 23/80* (2006.01)
(Continued)

(52) U.S. Cl.
CPC .............. *D01F 9/16* (2013.01); *B01J 23/80* (2013.01); *D01F 9/324* (2013.01); *B82Y 30/00* (2013.01); *B82Y 40/00* (2013.01)

(58) Field of Classification Search
CPC ... D01F 9/16; D01F 9/324; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133; B01J 23/80; B01J 23/745; B01J 35/023; B82Y 30/00; B82Y 40/00; C01B 32/336; C01B 32/158; C01B 32/159; C01B 32/16; C01B 32/162; C01B 32/164; C01B 32/166; C01B 32/168; C01B 32/17;
(Continued)

(56) References Cited

PUBLICATIONS

Jazaeri, et al., Fabrication of carbon nanofiber by pyrolysis of freeze-dried cellulose nanofiber, Cellulose 2011; 18: 1481-1485 (Year: 2011).*
Che, et al., Celluelose Fiber-Derived Carbon Catalyzed by Iron Oxide Nanoparticles, Mississippi State University Theses and Dissertation 2012; 978: pp. 1-41 (Year: 2012).*
(Continued)

*Primary Examiner* — Daniel C. McCracken
(74) *Attorney, Agent, or Firm* — Workman Nydegger

(57) ABSTRACT

A method includes a freezing process in which a solution or gel containing cellulose nanofibers is frozen to obtain a frozen component, a drying process in which the frozen component is dried in a vacuum to obtain a dry component, and a carbonizing process in which the dry component is heated and carbonized in a non-combustible atmosphere, and in the carbonizing process, the dry component is heated together with a reducing catalyst and also a material that generates a reducing gas by thermal decomposition.

6 Claims, 1 Drawing Sheet

(51) Int. Cl.
*D01F 9/32* (2006.01)
*B82Y 30/00* (2011.01)
*B82Y 40/00* (2011.01)

(58) Field of Classification Search
CPC ... C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C08J 3/075; C08L 1/02; C08L 1/08
See application file for complete search history.

(56) References Cited

PUBLICATIONS

Hoekstra, et al., The effect of iron catalyzed graphitization on the textural properties of carbonized cellulose: Magnetically separable grahitic carbon bodies for catalysis and remediation, Carbon 2016; 107: 248-260 (Year: 2016).*

Sumio Iijima et al., *Single-Shell Carbon Nanotubes of 1-nm Diameter*, Nature, vol. 363, No. 17, 1993, pp. 603-605.

Jing Kong et al., *Chemical Vapor Deposition of Methane for Single-Walled Carbon Nanotubes*, Chemical Physics Letters, vol. 292, 1998, pp. 567-574.

\* cited by examiner

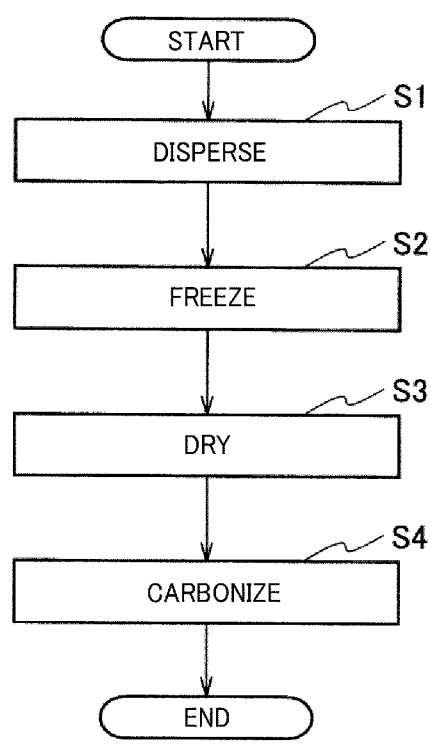

METHOD FOR PRODUCING CELLULOSE NANOFIBER CARBON

TECHNICAL FIELD

The present invention relates to a method of producing cellulose nanofiber carbon.

BACKGROUND ART

Carbon nanofibers generally have an outer diameter of 5 to 100 nm and have a fibrous shape having a fiber length 10 times the outer diameter or more. Carbon nanofibers have features such as high conductivity and a large specific surface area due to such a unique shape.

In the related art, examples of a method of producing carbon nanofibers include an electrode discharge method, a vapor deposition method, and a laser method (NPL 1 and NPL 2). In particular, as a production method by which mass production is possible, a method of producing cellulose nanofiber carbon by heating cellulose derived from a natural product is known.

CITATION LIST

Non Patent Literature

[0004] [NPL 1] S. Iijima, et al., "Single-shell carbon nanotubes of 1-nm diameter", Nature, Vol. 363, Jun. 17, 1993, p. 603-p. 605

[NPL 2] J. Kong, et al., "Chemical vapor deposition of methane for single-walled carbon nanotubes", Chemical Physics Letters 292, Aug. 14, 1998, p. 567-p. 574

SUMMARY OF THE INVENTION

Technical Problem

However, in the conventional production method, since aggregation occurs in a drying process and a heat treatment process of cellulose nanofibers, the nanofibers are sintered during the heat treatment and have a high density, and thus there is a problem that the specific surface area of the produced cellulose nanofiber carbon becomes small. In addition, in the conventional production method, since carbon is gasified and escapes during the heat treatment, there is a problem that the yield of cellulose nanofiber carbon is lowered due to the mass loss associated with gas generation.

The present invention has been made in view of the above circumstances, and an object of the present invention is to improve a method of producing cellulose nanofiber carbon.

Means for Solving the Problem

In order to address the above problem, there is provided a method of producing cellulose nanofiber carbon according to the present invention including a freezing process in which a solution or gel containing cellulose nanofibers is frozen to obtain a frozen component; a drying process in which the frozen component is dried in a vacuum to obtain a dry component; and a carbonizing process in which the dry component is heated and carbonized in a non-combustible atmosphere, and in the carbonizing process, the dry component is heated together with a reducing catalyst.

In the method of producing cellulose nanofiber carbon, the reducing catalyst is iron powder, and in the carbonizing process, the dry component is heated together with the iron powder.

In the method of producing cellulose nanofiber carbon, the reducing catalyst is iron powder and zinc powder, and in the carbonizing process, the dry component is heated together with the iron powder and the zinc powder.

In the method of producing cellulose nanofiber carbon, in the carbonizing process, the dry component is heated together with the reducing catalyst and a material that generates a reducing gas by thermal decomposition.

In the method of producing cellulose nanofiber carbon, the material that generates a reducing gas by the thermal decomposition is sodium bicarbonate, and in the carbonizing process, the dry component is heated together with the reducing catalyst and the sodium bicarbonate.

Effects of the Invention

According to the present invention, it is possible to provide a method of producing cellulose nanofiber carbon having a high yield and a large specific surface area.

BRIEF DESCRIPTION OF DRAWING

FIG. 1 is a diagram showing a process of producing cellulose nanofiber carbon.

DESCRIPTION OF EMBODIMENTS

A method of producing cellulose nanofiber carbon according to the present embodiment includes a freezing process, a drying process, and a carbonizing process. In the freezing process, a solution or gel containing cellulose nanofibers is frozen to obtain a frozen component. In the drying process, the frozen component is dried in a vacuum to obtain a dry component. In the carbonizing process, the dry component is heated and carbonized in a non-combustible atmosphere together with a reducing catalyst and also a material that generates a reducing gas by thermal decomposition.

That is, since the dried component of the cellulose nanofibers is heated and carbonized in a non-combustible atmosphere together with a reducing catalyst, CO and $CO_2$ generated by gasification of carbon are reduced by the reducing catalyst and carbonized again, and thus the mass loss associated with gas generation is minimized, and the yield of carbon is improved.

In addition, since the dried component of the cellulose nanofibers is heated and carbonized in a non-combustible atmosphere together with a reducing catalyst and a material that generates a reducing gas by thermal decomposition, a reducing gas is generated when the "material that generates a reducing gas by thermal decomposition" is heated, and since the reducing gas enters the cellulose nanofibers, aggregation of the cellulose nanofibers is minimized, and cellulose nanofiber carbon having a large specific surface area can be produced.

Hereinafter, one embodiment of the present invention will be described with reference to the drawings.

FIG. 1 is a diagram showing a method of producing cellulose nanofiber carbon according to the present embodiment. As shown in FIG. 1, the production method includes a dispersion process, a freezing process, a drying process, and a carbonizing process. When the production method starts, a carbon manufacturer prepares a cellulose nanofiber solution or gel. The solid content concentration of the cellulose nanofibers in the prepared cellulose nanofiber solution is preferably 0.001 to 80 mass % and more preferably 0.01 to 30 mass %.

Step S1;

First, in the dispersion process, the manufacturer uses, for example, a homogenizer, an ultrasonic washer, an ultrasonic homogenizer, a magnetic stirrer, a stirrer, or a shaking device, and uses a predetermined dispersion medium to disperse cellulose nanofibers contained in the prepared cellulose nanofiber solution.

As the dispersion medium, for example, an aqueous system such as water ($H_2O$) is used. In addition, as the dispersion medium, for example, an organic system such as carboxylic acid, methanol ($CH_3OH$), ethanol ($C_2H_5OH$), propanol ($C_3H_7OH$), n-butanol, isobutanol, n-butylamine, dodecane, unsaturated fatty acid, ethylene glycol, heptane, hexadecane, isoamyl alcohol, octanol, isopropanol, acetone, or glycerin may be used. A mixture of two or more of all of them may be used.

Here, the form of the cellulose nanofibers in the cellulose nanofiber solution prepared by the manufacturer is preferably a pre-dispersed form. When a cellulose nanofiber solution in which cellulose nanofibers are dispersed is used, the dispersion process is not necessary. When the cellulose nanofibers are in a non-dispersed form, the dispersion process is performed.

Step S2;

Next, in the freezing process, the manufacturer freezes the cellulose nanofiber solution containing the dispersed cellulose nanofibers to obtain a frozen component of the cellulose nanofibers.

For example, the cellulose nanofiber solution after the dispersion process is stored in a container such as a test tube, and the periphery of the container is cooled with a cooling material such as liquid nitrogen to freeze the cellulose nanofiber solution stored in the container. The freeze method is not particularly limited, and the dispersion medium in the cellulose nanofiber solution may be cooled to a freezing point or lower. For example, in addition to a method using the cooling material, the solution may be put into a freezer or the like and then cooled.

When the cellulose nanofiber solution is frozen in the freezing process, the dispersion medium in the solution loses its fluidity, the cellulose nanofibers, which are dispersoids, are fixed, and a 3D network structure (3D mesh structure) of the cellulose nanofibers is constructed.

Step S3;

Next, in the drying process, the manufacturer dries the frozen component of the cellulose nanofibers obtained in the freezing process in a vacuum to obtain a dried component of the cellulose nanofibers.

For example, the frozen dispersion medium in a solid state is sublimated. Specifically, the frozen component of the cellulose nanofibers obtained in the freezing process is stored in a container such as a flask, and the inside of the container is evacuated. When the frozen component of the cellulose nanofibers is disposed in a vacuum atmosphere, the sublimation point of the dispersion medium decreases, and the frozen solid state is sublimated to obtain a dried component of the cellulose nanofibers.

The degree of vacuum in the container varies depending on the dispersion medium used, but it is not particularly limited as long as it is a degree of vacuum at which the dispersion medium sublimates. For example, when water ($H_2O$) is used as the dispersion medium, it is necessary to set the pressure to a degree of vacuum of 0.06 MPa or less, but since heat is taken away as sublimation latent heat, it will take time to dry. Therefore, the degree of vacuum is preferably $1.0 \times 10^{-6}$ Pa to $1.0 \times 10^{-2}$ Pa.

Here, when the frozen component of the cellulose nanofibers is dried in the drying process, heat may be applied using a heater or the like.

Step S4;

Finally, in the carbonizing process, the manufacturer spreads a reducing catalyst and also a predetermined amount of a material that generates a reducing gas by thermal decomposition in a container such as a crucible, puts the dried component of the cellulose nanofibers obtained in the drying process thereinto and heats and carbonizes the dry component in a non-combustible atmosphere to obtain cellulose nanofiber carbon (a carbon material).

The reducing catalyst may be any material as long as it has a reducing action. For example, metal powders such as titanium, vanadium, chromium, iron, manganese, cobalt, nickel, copper, zinc, ruthenium, palladium, rhodium, silver, gold, and platinum may be used. The metal powder may be adsorbed on an insoluble carrier such as activated carbon, alumina, or diatomaceous earth. Inorganic compounds, inorganic complexes, and the like such as metal oxides composed of one or more of the above metal elements, similar metal nitrides, similar ammine complexes, cyan complexes, halogeno complexes, hydroxy complexes, metal elements, oxides, and nitrides may be used. In addition, a mixture of two or more of all of them may be used.

The material that generates a reducing gas by thermal decomposition is, for example, an organic compound such as a hydrocarbon. In addition, a hydrogen storage alloy composed of an alloy of a metal such as magnesium, calcium, titanium, vanadium, manganese, zirconium, nickel, iron, palladium, lanthanum, or rhenium may be used. Sodium bicarbonate may be used.

In the carbonizing process, in a method of carbonizing the cellulose nanofibers, for example, the dried component of the cellulose nanofibers is combusted in an inactive gas atmosphere at 200° C. to 2,000° C. More preferably, the dried component may be carbonized by firing at 600° C. to 1,800° C. In addition, as the type of gas with which cellulose does not combust, for example, an inactive gas such as nitrogen gas or argon gas is used. In addition, a reducing gas such as hydrogen gas or carbon monoxide gas may be used, or carbon dioxide gas may be used. Carbon dioxide gas or carbon monoxide gas which has an activation effect on cellulose nanofiber carbon and is expected to be highly activated is more preferable.

According to the method of producing cellulose nanofiber carbon described above, in the freezing process, cellulose nanofibers, which are dispersoids, are fixed, and a 3D network structure of the cellulose nanofibers is constructed. In addition, in the drying process, the cellulose nanofibers maintaining the 3D network structure are taken out and cellulose nanofiber carbon is obtained in the carbonizing process.

The cellulose nanofiber carbon has an elastic property because it has a 3D network structure of the co-continuous component in which cellulose nanofibers are connected in a mesh pattern. In addition, in the carbonizing process, the dried component of the cellulose nanofibers is heated and carbonized in a non-combustible atmosphere together with a reducing catalyst and also a material that generates a reducing gas by thermal decomposition, and cellulose nanofiber carbon has features such a high conductivity, corrosion resistance, a high yield, and a large specific surface area.

In addition, the cellulose nanofiber carbon produced by the production method of the present embodiment is preferable for, for example, a battery, a capacitor, a fuel cell, a biofuel cell, a microbial battery, a catalyst, a solar cell, a semiconductor producing process, a medical instrument, a beauty instrument, a filter, a heat-resistant material, a flame-resistant material, an insulating material, a conductive material, an electromagnetic wave shielding material, an electromagnetic wave noise absorbing material, a heating element, a microwave heating element, cone paper, clothes, carpets, mirror fogging prevention, a sensor, and a touch panel.

In order to check for the presence of the above features, an experiment in which the cellulose nanofiber carbon produced by the production method of the present embodiment (Experimental Examples 1 to 5), and the cellulose nanofiber carbon (comparative example) produced by a production method without using a reducing catalyst or a material that generates a reducing gas by thermal decomposition in the carbonizing process of the present embodiment were compared.

Experimental Example 1

In Example 1, 1 g of cellulose nanofibers (commercially available from Nippon Paper Industries Co., Ltd.) and 10 g of ultra-pure water were stirred with a homogenizer (commercially available from SMT Co., Ltd.) for 12 hours to prepare a cellulose nanofiber dispersion solution, and the prepared solution was poured into a test tube. Thus, the test tube was immersed in liquid nitrogen for 30 minutes and the cellulose nanofiber solution was completely frozen. Then, the frozen cellulose nanofiber solution was taken out and put on a Petri dish, put into a freeze-drying machine (commercially available from Tokyo Rikakikai Co., Ltd.), and dried in a vacuum of 10 Pa or less to obtain a dried component of the cellulose nanofibers. Finally, the dried component of the cellulose nanofibers was put into three alumina crucibles in which 1 g, 5 g, and 10 g of iron powder having an average particle size of 30 μm (commercially available from Wako Pure Chemical Industries, Ltd.) were spread and the cellulose nanofibers were carbonized by firing under a nitrogen atmosphere at 800° C. for 2 hours to produce cellulose nanofiber carbon.

Experimental Example 2

In Experimental example 2, cellulose nanofiber carbon was produced in the same process as in Example 1 using iron powder having an average particle size of 70 nm (commercially available from Kanto Chemical Co., Inc.).

COMPARATIVE EXAMPLE

In a comparative example, in the same process as in Experimental example 1, a dried component of the cellulose nanofibers was put into an alumina crucible in which no iron powder was spread, and the cellulose nanofibers were carbonized by firing under a hydrogen atmosphere at 800° C. for 2 hours to produce cellulose nanofiber carbon.

Here, Table 1 shows the yields according to Experimental example 1, Experimental example 2, and the comparative example. The yield is calculated as {(weight of cellulose nanofiber carbon after heat treatment weight of dried component of cellulose nanofibers before heat treatment)× [100]}.

TABLE 1

| Experimental example | amount of iron powder | | |
|---|---|---|---|
| | 1 g | 5 g | 10 g |
| Experimental example 1 | 11% | 16% | 20% |
| Experimental example 2 | 22% | 31% | 39% |
| Comparative example | | 5% | |

In Table 1, comparing Experimental examples 1 and 2 and the comparative example, it can be understood that the yield of carbon was improved when the dried component of the cellulose nanofibers was heated together with iron powder. In addition, comparing each amount of iron powder and additionally comparing Experimental example 1 and Experimental example 2, it can be understood that the yield of carbon was improved as the amount of iron powder was larger and the particle size of the iron powder was smaller. This is thought to be caused by the fact that, since CO gas was generated in a process of carbonizing carbon, a reduction reaction of $2CO \rightarrow C+CO_2$ was promoted by a catalytic effect of iron powder, and the CO gas was regenerated as carbon, the yield of carbon was improved. Regarding the effect, it was thought that, as the particle size of the iron powder was smaller and the surface area per weight was larger, the catalytic action occurred more easily, and as the particle size of the iron powder was smaller, a stronger effect could be exhibited with a smaller amount of catalyst.

Experimental Example 3

In Experimental example 3, a dried component of the cellulose nanofibers was put into three alumina crucibles in which 10 g of iron powder having an average particle size of 70 nm (commercially available from Kanto Chemical Co., Inc.) and 1 g, 5 g, and 10 g of zinc powder having an average particle size of 8 μm (commercially available from Wako Pure Chemical Industries, Ltd.) were spread and cellulose nanofiber carbon was produced in the same process as in Example 1.

Experimental Example 4

In Experimental example 4, cellulose nanofiber carbon was produced in the same process as in Example 3 using iron powder as in Experimental example 3 and zinc powder having an average particle size of 50 nm (commercially available from Kanto Chemical Co., Inc.).

Here, Table 2 shows the yields according to Experimental example 3 and Experimental example 4.

TABLE 2

| Experimental example | amount of zinc powder | | |
|---|---|---|---|
| | 1 g | 5 g | 10 g |
| Experimental example 3 | 21% | 28% | 34% |
| Experimental example 4 | 37% | 47% | 52% |

In Table 2, comparing each amount of zinc powder and comparing Experimental example 3 and Experimental example 4, it can be understood that the yield of carbon was improved as the amount of zinc powder was larger and the particle size was smaller. This is thought to be caused by the fact that, since CO gas was generated in a process of carbonizing carbon, a reduction reaction of $2CO \rightarrow C+CO_2$ was promoted due to the catalytic effect of iron powder, and the CO gas was regenerated as carbon. Here, additionally, the generated carbon dioxide promoted a reduction reaction of $2CO_2 \rightarrow 2CO+O_2$ using zinc powder as a catalyst, a reduction reaction of $2CO \rightarrow C+CO_2$ was repeatedly caused due to the catalytic effect of iron powder again, and thus the amount of carbon generated increased. It is thought that the yield of carbon was improved due to these operational effects compared to when only iron powder was used.

Regarding the effect, it was thought that, as the particle size of the zinc powder was smaller and the surface area per unit weight was larger, the catalytic action occurred more easily, and as the particle size of the zinc powder was smaller, a stronger effect could be exhibited with a small amount of catalyst. On the other hand, it suggests that, as the amount of metal powder increased, improvement in yield tended to saturate, but when the amount of catalyst increased, the amount of catalyst with respect to the amount of reaction could be excessive.

Experimental Example 5

In Example 5, in order to minimize aggregation of the cellulose nanofibers and increase the specific surface area of cellulose nanofiber carbon, a larger amount of reducing gas was generated additionally using sodium bicarbonate, which is a material that generates a reducing gas by thermal decomposition. Specifically, the dried component of the cellulose nanofibers was put into three alumina crucibles in which iron powder and zinc powder were spread and additionally 1 g, 5 g, and 10 g of sodium bicarbonate (commercially available from Kanto Chemical Co., Inc.) were spread over there, and cellulose nanofiber carbon was produced in the same process as in Example 4.

Here, Table 3 shows the BET specific surface area and the porosity of the cellulose nanofiber carbon obtained in Experimental example 5 and the cellulose nanofiber carbon of the comparative example produced in the production method without using sodium bicarbonate.

TABLE 3

| Experimental example | | Specific surface area | Porosity |
|---|---|---|---|
| Experimental example 5 | 1 g | 1,133 m$^2$/g | 90% or more |
| | 5 g | 1,204 m$^2$/g | 95% or more |
| | 10 g | 1,233 m$^2$/g | 98% or more |
| Comparative example | | 65 m$^2$/g | 10% or less |

In Table 3, it can be understood that the cellulose nanofiber carbon obtained in Experimental example 5 had a larger specific surface area and a higher porosity than the cellulose nanofiber carbon obtained in the comparative example, and the specific surface area and the porosity were larger as the amount of sodium bicarbonate was larger. This is thought to be caused by the fact that sodium bicarbonate was thermally decomposed in a procedure of heat treatment, the generated carbon dioxide gas entered the dried component of the cellulose nanofibers, and carbonization proceeded when aggregation was suppressed while being raised.

As described above, according to the present embodiment, by performing a freezing process in which a solution or gel containing cellulose nanofibers is frozen to obtain a frozen component, a drying process in which the frozen component is dried in a vacuum to obtain a dry component, and a carbonizing process in which the dry component is heated and carbonized in a non-combustible atmosphere together with a reducing catalyst, it is possible to produce cellulose nanofiber carbon with a high yield.

In addition, according to the present embodiment, in the carbonizing process, since the dried component of the cellulose nanofibers is heated and carbonized in a non-combustible atmosphere together with the reducing catalyst and a material that generates a reducing gas by thermal decomposition, it is possible to produce cellulose nanofiber carbon having a large specific surface area.

REFERENCE SIGNS LIST

S1 to S4 Step

The invention claimed is:

1. A method of producing cellulose nanofiber carbon, comprising:
 a freezing process in which a solution or gel containing cellulose nanofibers is frozen to obtain a frozen component;
 a drying process in which the frozen component is dried in a vacuum to obtain a dry component; and
 a carbonizing process in which the dry component is heated and carbonized in a non-combustible atmosphere, wherein, in the carbonizing process, the dry component is heated together with a reducing catalyst,
 wherein the reducing catalyst is iron powder and zinc powder, and wherein, in the carbonizing process, the dry component is heated together with the iron powder and the zinc powder.

2. The method of producing cellulose nanofiber carbon according to claim 1, wherein, in the carbonizing process, the dry component is heated together with the iron powder and the zinc powder and a material that generates a reducing gas by thermal decomposition.

3. The method of producing cellulose nanofiber carbon according to claim 2, wherein the material that generates a reducing gas by the thermal decomposition is sodium bicarbonate, and wherein, in the carbonizing process, the dry component is heated together with the iron powder and the zinc powder and the sodium bicarbonate.

4. A method of producing cellulose nanofiber carbon, comprising:
 a freezing process in which a solution or gel containing cellulose nanofibers is frozen to obtain a frozen component;
 a drying process in which the frozen component is dried in a vacuum to obtain a dry component; and
 a carbonizing process in which the dry component is heated and carbonized in a non-combustible atmosphere, wherein, in the carbonizing process, the dry component is heated together with a reducing catalyst,
 wherein, in the carbonizing process, the dry component is heated together with the reducing catalyst and a material that generates a reducing gas by thermal decomposition.

5. The method of producing cellulose nanofiber carbon according to claim 4, wherein the material that generates a reducing gas by the thermal decomposition is sodium bicarbonate, and wherein, in the carbonizing process, the dry component is heated together with the reducing catalyst and the sodium bicarbonate.

6. The method of producing cellulose nanofiber carbon according to claim 4, wherein the reducing catalyst is iron powder and zinc powder.

* * * * *